Dec. 12, 1933.    K. HARDT    1,939,299
WHEEL BRAKE FOR MOTOR VEHICLES
Filed May 15, 1930

Inventor: Karl Hardt
by （signature）
attorney.

Patented Dec. 12, 1933

1,939,299

UNITED STATES PATENT OFFICE 1,939,299

WHEEL BRAKE FOR MOTOR VEHICLES

Karl Hardt, Malkendorf, Germany

Application May 15, 1930, Serial No. 452,752, and in Germany May 16, 1929

4 Claims. (Cl. 188—76)

This invention relates to a wheel brake for motor vehicles. It differs from the known wheel brakes in that the casing enclosing same is shut off by novel dust- and damp-proof means from the connecting parts, gear case and wheel hub. The brake may be used both for wheels mounted rigidly on the axle and also for steering wheels.

An embodiment of the invention is illustrated by way of example in the accompanying drawing in which:—

Figure 1:
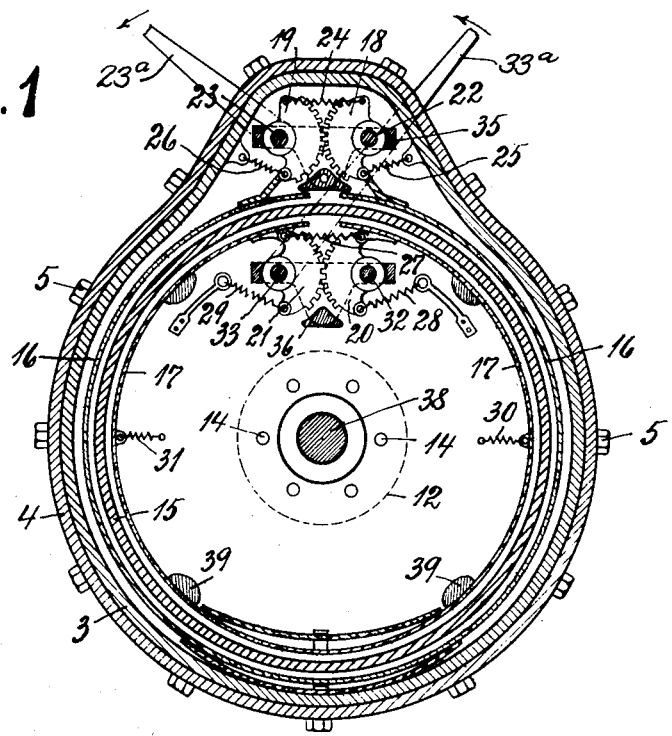
Fig. 1 is a transverse section through a wheel brake.
Figure 2:
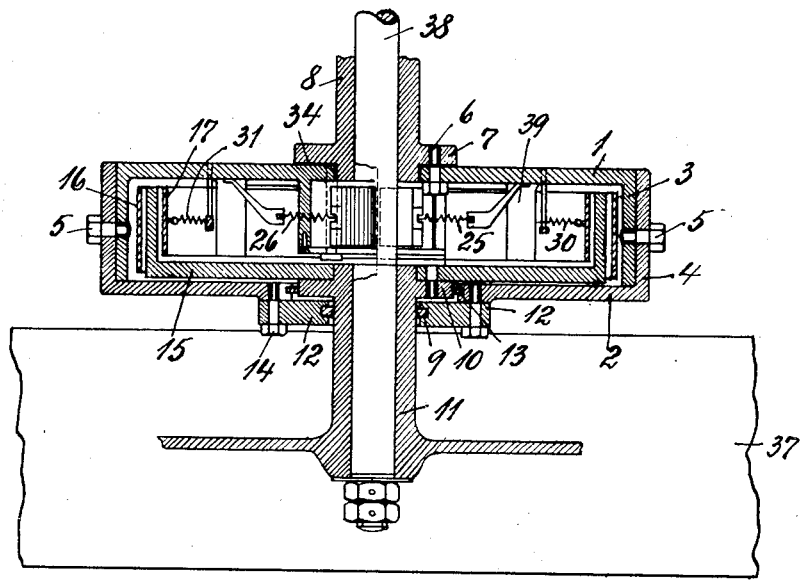
Fig. 2 is a section on the horizontal diametrical line of Fig. 1, the view being partly in elevation.

The brake casing consists of two disks 1 and 2, having the respective coacting flanges 3 and 4 which engage one over the other and are connected by means of screws 5. The disk 1 is rigidly connected with a suitable fixed support such as a flange 7 of the gear case 8 by means of screws 6, whereas the disk 4 is rigidly held by means of a two part annular disk or collar 12, packed against the wheel hub 11, which is provided with a flange 10, by means of a packing 9. The disk 2 is packed against the hub flange 10 by means of a further packing 13, and the ring disk 12 is removably connected to the disk 2 by means of screws 14. The brake drum has the usual disk 15 which is secured to flange 10 and which is provided with the usual peripheral flange. Brake bands 16 and 17 are arranged to engage respectively against the outer and inner faces of the brake drum flange and are normally spaced slightly therefrom. The two ends of the brake band 16 are respectively fastened to the toothed meshing segments 18 and 19, and the two ends of the brake band 17 are fastened respectively to the toothed meshing segments 20 and 21. The two segments 18 and 19 meshing, the one with the other, are rotatably mounted on the shafts 22 and 23 and are urged by the spiral springs 24, 25 and 26 to effect inoperative positioning of the brake band 16. In a similar manner the two toothed segments 20 and 21 mounted on the shafts 32 and 33 are influenced by the helical springs 27, 28, 29, 30 and 31.

The brake lever 23a adapted to be operated by foot is keyed on the shaft 23, and the brake lever 33a adapted to be operated by hand on the shaft 33.

If a brake lever is pulled, the toothed segments 18 and 19 or 20 and 21 roll one on the other, tensioning the respective helical springs, and the brake band 16 is pressed tightly against the outer face, or the brake band 17 is pressed against the inner face of the flange of the brake drum 15. As soon as the brake lever is released, the springs effect an immediate releasing of the brake band 16 or 17 from the brake drum 15, so that detrimental friction between the brake elements is prevented when the brake is not in use.

The disk 1 is preferably screwed rigidly onto the gear case 8, a packing 34 being interposed. The disk 2 is mounted tightly packed by means of packings 9 and 13 on the wheel hub, and the disks 1 and 2 are tightly connected by screws 5 so that an absolutely dust- and moisture-proof packing of the brake casing against the connecting parts is obtained.

The shafts 22 and 23 and 32 and 33 are journaled on one side in a bearing arranged in the casing disk 1 and on the other side in a bracket 35 or 36 fastened on the disk 1. All the remaining parts, such as springs 25, 26, 28, 29 and the counter bearing 39 for the brake band 17, are arranged on the casing disk 1.

The annular disk 12 is formed in two parts. After loosening the screws 14, the annular disk can be removed and the wheel 37 pulled off the axle 38 with the hub 11. After loosening the screws 5, the disk 2 is removed, when the brake elements are accessible for renewing or repairing.

I claim:—

1. The combination with a fixed part of a vehicle and the hub of a vehicle wheel, of a brake casing consisting of a pair of disks, each provided with a peripheral flange, said flanges fitting each other telescopically, one of said disks being fixed to said fixed part and the other of said disks having an opening therein and surrounding said wheel hub, and screws passing radially through the outer of said flanges and engaging in the inner flange to hold the casing parts together.

2. The combination with a fixed part of a vehicle and the hub of a vehicle wheel, of a brake casing consisting of a pair of disks, each provided with a peripheral flange, said flanges fitting each other telescopically, one of said disks being fixed to said fixed part and the other of said disks having an opening therein and surrounding said wheel hub, screws passing through the outer of said flanges and engaging in the inner flange to hold the casing parts together, said hub having a flange thereon in the plane of the second disk and substantially closing said opening, and a packing in the space between the periphery of said hub flange and the wall of said opening.

3. The combination with a fixed part of a vehicle and the hub of a vehicle wheel, of a brake casing consisting of a pair of disks, each provided with a peripheral flange, said flanges fitting each other telescopically, one of said disks being fixed to said fixed part and the other of said disks having an opening therein and surrounding said wheel hub, screws passing through the outer of said flanges and engaging in the inner flange to hold the casing parts together, said hub having a flange thereon in the plane of the second disk and substantially closing said opening, a packing in the space between the periphery of said hub flange and the wall of said opening, a split collar surrounding said hub and having its parts screw attached to the second disk, and a second packing between the hub and the split collar.

4. The combination with a brake drum having a peripheral flange portion, of an external brake for said flange, an internal brake for said flange, means for selectively forcing said brakes into engagement with said flange, and a casing entirely surrounding the drum and both brakes, said casing consisting of a pair of discs each having a peripheral flange with the flange of one disc fitting within the flange of the other disc, and screws passing radially through the outer flange and into the inner flange and said means.

KARL HARDT.